(12) United States Patent
Milne et al.

(10) Patent No.: US 9,359,544 B2
(45) Date of Patent: Jun. 7, 2016

(54) COMPOSITION AND METHOD FOR TREATING SUBTERRANEAN FORMATION

(71) Applicant: Schlumberger Technology Corporation, Sugar Land, TX (US)

(72) Inventors: Arthur William Milne, Mexico City (MX); Emilio Miquilena, Ciudad del Carmen (MX); Syed A. Ali, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 14/102,532

(22) Filed: Dec. 11, 2013

(65) Prior Publication Data

US 2015/0159081 A1    Jun. 11, 2015

(51) Int. Cl.
E21B 43/26    (2006.01)
C09K 8/60    (2006.01)
E21B 43/28    (2006.01)
C09K 8/74    (2006.01)

(52) U.S. Cl.
CPC . *C09K 8/602* (2013.01); *C09K 8/74* (2013.01); *E21B 43/283* (2013.01)

(58) Field of Classification Search
CPC ......... E21B 43/26; E21B 43/16; C09K 8/584; C09K 8/532
USPC ......................... 166/307, 308.1, 308.2, 305.1
See application file for complete search history.

(56) References Cited

U.S. PATENT DOCUMENTS

| | | | |
|---|---|---|---|
| 6,302,209 B1 * | 10/2001 | Thompson et al. | 166/305.1 |
| 7,148,184 B2 * | 12/2006 | Francini et al. | 507/241 |
| 7,303,018 B2 | 12/2007 | Cawiezel et al. | |
| 7,380,602 B2 | 6/2008 | Brady et al. | |
| 7,741,252 B2 * | 6/2010 | Chen et al. | 507/244 |
| 8,403,051 B2 | 3/2013 | Huang et al. | |
| 2003/0019627 A1 | 1/2003 | Qu et al. | |
| 2004/0177960 A1 | 9/2004 | Chan et al. | |
| 2005/0067165 A1 | 3/2005 | Cawiezel et al. | |
| 2011/0303414 A1 * | 12/2011 | Seth et al. | 166/305.1 |
| 2011/0315384 A1 * | 12/2011 | Miquilena et al. | 166/305.1 |
| 2012/0090845 A1 | 4/2012 | Huang et al. | |
| 2012/0264657 A1 | 10/2012 | van Zanten | |

FOREIGN PATENT DOCUMENTS

WO    WO2005008027    1/2005
WO    WO2012051007    4/2012

OTHER PUBLICATIONS

Sayed et al., "Core Flood Study of a New Emulsified Acid with Reservoir Cores," SPE 157310, SPE International Production and Operations Conference and Exhibition, May 14-16, 2012, Doha Qatar, Society of Petroleum Engineers, 17 pages total.

(Continued)

*Primary Examiner* — Doug Hutton, Jr.
*Assistant Examiner* — Silvana Runyan
(74) *Attorney, Agent, or Firm* — Jeffrey R. Anderson; Rachel E. Greene; Tim Curington

(57) ABSTRACT

A composition and method for performing a treatment of a subterranean formation. The composition includes an emulsified acid and a sulfobetaine surfactant. The emulsified acid and the sulfobetaine surfactant may be mixed to form a treatment composition, which may be injected into a subterranean formation as part of an acid fracturing or hydraulic fracturing treatment.

18 Claims, 3 Drawing Sheets

(56) References Cited

OTHER PUBLICATIONS

Sayed et al., "Effect of Emulsifier Concentration and Acid Volume Fraction on the Elastic Properties of Emulsified Acids," SPE Middle East Oil and Gas Show and Conference, SPE 141664, Sep. 25-28, 2011, Manama, Bahrain, Society of Petroleum Engineers, 11 pages total.

Pournik, et al., "Influence of Acid-Fracture Fluid Properties on Acid Etched Surfaces and Resulting Fracture Conductivity," SPE 128070, 2010 SPE International Symposium and Exhibition on Formation Damage Control, Feb. 10-12, 2010, Lafayette, Louisiana, USA, Society of Petroleum Engineers, 14 pages total.

Chunming, et al., "Application and Study of Acid Technique Using Novel Selective Emulsified Acid System," SPE 131216, CPS/SPE International Oil & Gas Conference and Exhibition, Jun. 8-10, 2010, Beijing, China, Society of Petroleum Engineers, 6 pages total.

Al-Mutairi, et al., "Effect of Droplet Size on the Reaction Kinetics of Emulsified Acid With Calcite," SPE 112454, 2008 SPE International Symposium and Exhibition on Formation Damage Control, Feb. 13-15, 2008, Lafayette, Louisiana, USA, Society of Petroleum Engineers, 19 pages total.

Al-Mutairi, et al., "Droplet Size Analysis of Emulsified Acid," SPE 126155, 2009 SPE Saudi Arabia Section Technical Symposium and Exhibition, May 9-11, 2009, AlKhobar, Saudi Arabia, Society of Petroleum Engineers, 13 pages total.

Al-Mutairi, et al., "Effect of Droplet Size, Emulsifier Concentration, and Acid Volume Fraction on the Rheological Properties and Stability of Emulsified Acids," SPE 107741, European Formation Damage Conference May 30-Jun. 1, 2007 Scheveningen, The Netherlands, Society of Petroleum Engineers, 16 pages total.

Buijse, et al., "Novel Application of Emulsified Acids to Matrix Stimulation of Heterogeneous Formations," SPE 65355, SPE Prod & Faclities 15 (3), Aug. 2000, pp. 208-213, Society of Petroleum Engineers.

Al-Yaari, et al., "Effect of Water Fraction on Surfactant-Stabilized Water-in-Oil Emulsion Flow Characteristics," SPE 164350, SPE Middle East Oil and Gas Show and Conference, Mar. 10-13, 2013, Manama, Bahrain, Society of Petroleum Engineers, 10 pages total.

Sayed, et al., "A New Emulsified Acid to Stimulate Deep Wells in Carbonate Reservoirs," SPE 151061, SPE International Symposium and Exhibiton on Formation Damage Control, Feb. 15-17, 2012, Lafayette, Louisiana, USA, Society of Petroleum Engineers, 26 pages total.

Sayed, et al., "Elastic Properties of Emulsified Acids: Effect of Emulsifier Concentration and Temperature," SPE 149074, SPE/DGS Saudi Arabia Section Technical Symposium and Exhibition, May 15-18, 2011, Al-Khobar, Saudi Arabia, Society of Petroleum Engineers, 14 pages total.

Appicciutoli, et al., "Novel Emulsified Acid Boosts Production in a Major Carbonate Oil Field with Asphaltene Problems," SPE 135076, SPE Annual Technical Conference and Exhibition, Sep. 19-22, 2010, Florence, Italy, Society of Petroleum Engineers, 16 pages total.

Nasr-El-Din, et al., "Development and Field Application of a New, Highly Stable Emulsified Acid," SPE 115926, 2008 SPE Annual Technical Conference and Exhibition, Sep. 21-24, 2008, Denver, Colorado, USA, Society of Petroleum Engineers, 11 pages total.

Sarma, et al., "Development of a Deep-Penetrating Emulsified Acid and Its Application in a Carbonate Reservoir," SPE 105502, 15th SPE Middle East Oil & Gas Show and Conference, Mar. 11-14, 2007, Bahrain International Exhibiton Centre, Kingdom of Bahrain, Society of Petroleum Engineers, 7 pages total.

Sayed, et al., "Reaction Rate of Emulsified Acids and Dolomite," SPE 151815, SPE International Symposium and Exhibition on Formation Damage Control, Feb. 15-17, 2012, Lafayette, Louisiana, USA, Society of Petroleum Engineers, 20 pages total.

International Search Report and Written Opinion dated Feb. 24, 2015, for PCT/US2014/066797, filed on Nov. 21, 2014.

Nasr-El-Din, H.A. et al. Field application of emulsified acid-based system to stimulate deep, sour gas reservoirs in Saudi Arabia's Society of Petroleum Engineers. 2001, SPE 71693, pp. 1-16.

* cited by examiner

COMPOSITION AND METHOD FOR TREATING SUBTERRANEAN FORMATION

BACKGROUND

This disclosure generally relates to treatment of oil and gas reservoirs.

Hydrocarbons (oil, condensate and gas) are typically produced from wells that are drilled into the formations containing them. For a variety of reasons, such as inherently low permeability of the reservoirs or damage to the formation caused by drilling and completion of the well, the flow of hydrocarbons into the well may be low. In this case, the well can be stimulated, using a variety of techniques, including hydraulic fracturing, chemical stimulation (sometimes referred to as acidizing or matrix acidizing), or a combination of the two (referred to as acid fracturing). During stimulation of a subterranean formation, a treatment designed to treat an area of a formation at or near a wellbore, otherwise known as a matrix treatment, may result in particular challenges.

In matrix acidizing of carbonates, an acid often used for stimulation of the carbonate formations is hydrochloric acid (HCl). A goal in matrix acidizing is for an acid to create wormholes in the formation, thereby stimulating the formation. However, the reaction kinetics with carbonate and the corrosion rates of parts of the formation, including those in contact with the wellbore, will increase with temperature. As a result, the corrosion rates at high temperatures are difficult to control and the reaction kinetics can result in an inefficient stimulation.

In acid fracturing, in addition to the challenge of controlling corrosion rates, the rate at which the acid may spend when injected into a hydraulic fracture, and the distance of the acid from the wellbore, may each be affected by the reaction kinetics of the acid and the width of the hydraulic fracture.

The industry may use an emulsified acid system as a retarded acid system to aid in stimulation of a subterranean formation, such as a carbonate reservoir, to slow and control reaction and corrosion rates. The emulsified acid system may also generate some control of fluid loss, which can allow for more fluid to remain in a fracture and thus a wider hydraulic fracture.

Emulsions generally comprise two immiscible phases. The immiscible phases may include a continuous phase and a discontinuous phase. Emulsions may be used in various oil and gas applications. For instance, emulsions may be used for subterranean treatment applications, including drilling, production and completion operations.

Emulsion stabilizing agents may be surfactant-based. In this case, the emulsion stabilizing agents generally interact in such a way where the surface tension of the interface between water and oil is decreased, which may slow a natural tendency of the immiscible phases to separate.

One industry formulation of an emulsified acid system, often used in matrix and acid fracturing treatments, is an oil-outside-phase formulation with 30% oil and 70% acid. The acid used is most commonly HCl. However, these systems are often subject to high friction pressures and relatively low viscosities at some temperatures, resulting in small hydraulic fracture width and faster spending of the acid being used in the treatment. The viscosity of the emulsion generally decreases with increasing temperature, and often becomes minimal above 100° C. Such limitations may reduce the length of the conductivity fracture and ultimately inhibit productivity.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The statements made merely provide information relating to the present disclosure, and may describe some embodiments illustrating the subject matter of this application.

In aspects, compositions are disclosed. The compositions may be used for performing a treatment of a subterranean formation. The compositions may include an emulsified acid and a sulfobetaine surfactant.

In further aspects, methods are disclosed. The methods may be used to treat a subterranean formation. The methods may include adding a sulfobetaine surfactant to an emulsified acid to form a treatment composition, and injecting the treatment composition into the subterranean formation.

In further aspects, further methods are disclosed. The methods may be used to perform an acidizing treatment in a subterranean formation. The methods may include adding a sulfobetaine surfactant to an emulsified acid, thereby forming a treatment compositions, and
injecting the treatment compositions to the subterranean formation to thereby induce a fracture at a portion of the subterranean formation.

DETAILED DESCRIPTION

Figure 1:
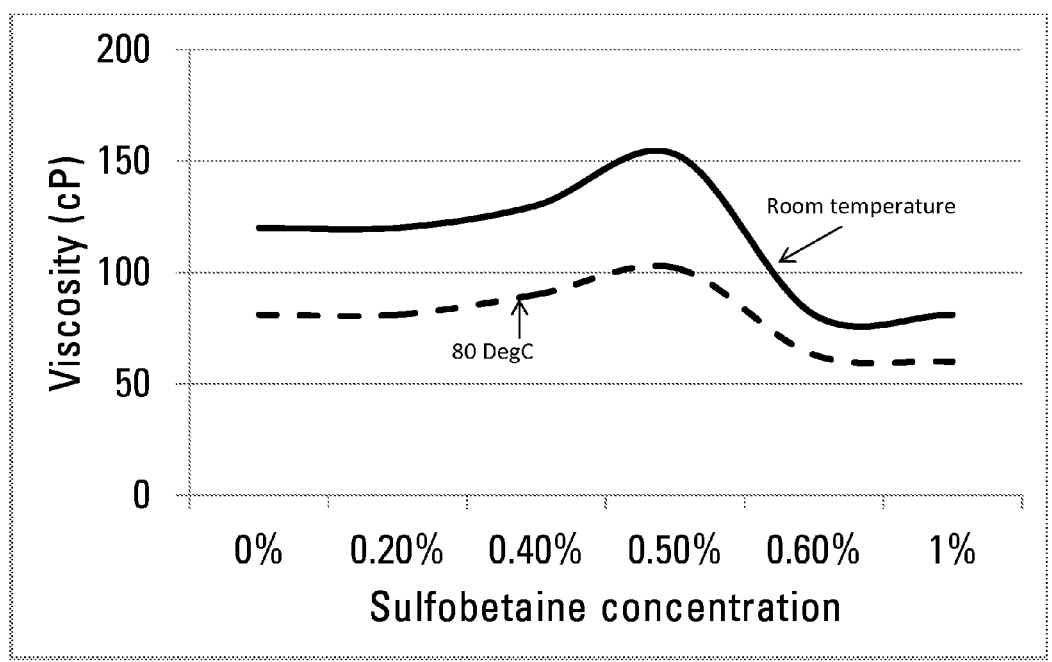
FIG. 1 shows a graphical example of the viscosities of compositions according to one or more embodiments herein.

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

The following definitions are provided in order to aid those skilled in the art in understanding the detailed description.

The term "fracturing" or "acid fracturing" refers to the process and methods of breaking down a geological formation, i.e., the geological formation around a wellbore, and creating a fracture, in order to increase production rates from a hydrocarbon reservoir. The fracturing methods otherwise use techniques known in the art.

The term "matrix acidizing" refers to a process where treatments of acid or other reactive chemicals are pumped into the formation at a pressure below which a fracture can be created. The matrix acidizing methods otherwise use techniques known in the art.

The term "viscosity" refers to a property of a fluid or slurry that indicates its resistance to flow, defined as the ratio of shear stress to shear rate. Viscosity can be expressed mathematically. Viscosity can be measured by various techniques, including using rheometers and viscometers.

The term "emulsifier" refers to chemical additive that creates a dispersion of one immiscible liquid into another (an emulsion), by reducing the interfacial tension between the two liquids to achieve stability. An emulsified acid is an acid that includes an emulsifier.

In embodiments, to change the wettability of a geological surface, a matrix acidizing treatment may be made to come into contact with the surface of the formation. Such a process may wet the surface of the geological formation, such as carbonate rock, sandstones or the like, and allow for stimulation of the formation. The matrix treatment may include the use of an emulsified acid system, which may include a fully formulated emulsified acid. Such a treatment may allow for the acid to penetrate, or wormhole, more than a few inches into the formation. Further, such a system, when the system includes fluid that is advantageously retarded and viscous, especially when pumped below the fracture gradient, may improve the wormholing efficiency of the acid. This may result in wider and longer hydraulic and etched fractures, which can improve wellbore productivity.

In embodiments, the emulsified acid system includes, for example, an emulsifier, a corrosion inhibitor, an inhibitor aid, one or more other acids, and a diesel compound. The emulsifier may be a commercially available emulsifier, such as AQUET 942®, which is a compound available from Baker Petrolite, Sugar Land, Tex., that is supplied as about 50% active ingredient and about 50% organic solvents; other examples include mixture of isopropanol and ccoalkyl amines and acetates. The corrosion inhibitor may be any compound that inhibits corrosion. The inhibitor aid may be, for example, formic acid, potassium iodide, or cupric chloride, and mixtures thereof.

The one or more other acids included in the emulsified acid system may be hydrochloric acid (HCl), though other acids may be used. The amount of diesel included in the emulsified acid system may be any amount of diesel, or may be an amount sufficient to create an emulsion from between 90:10 (acid:diesel) and 60:40 (acid:diesel). In some embodiments, the amount of diesel may be sufficient to create a 70:30 (acid:diesel) emulsion or an 80:20 (acid:diesel) emulsion.

In embodiments in which the one or more other acids is HCl, the concentration of HCl may be between 5 wt. % and 32 wt. % of the emulsified acid, or between 10 wt. % and 28 wt. % of the emulsified acid, or between 15 wt. % and 22 wt. % of the emulsified acid.

In embodiments, the emulsified acid system may include 0.1-1.0 vol. % of emulsifier, 0.05-0.2 vol. % corrosion inhibitor, 0.1-1.0 vol. % of formic acid, 20-25 wt. % HCl, and an amount of diesel sufficient to make about a 70:30 (acid:diesel) emulsion or a 80:20 (acid:diesel) emulsion. In some embodiments, the emulsified acid system includes about 0.3 or about 0.6 vol. % of emulsifier, about 0.1 vol. % corrosion inhibitor, about 0.5 vol. % formic acid, about 22% HCl, and an amount of diesel sufficient to make about a 70:30 (acid:diesel) emulsion or a 80:20 (acid:diesel) emulsion. The amount of diesel used and the resultant emulsion may allow for optimal reactivity, viscosity and friction pressure, and fluid stability.

In matrix applications, such a retarded, viscous fluid, especially when pumped below the fracture gradient, may improve the wormholing efficiency of the acid. This may be particularly beneficial in formations comprised of carbonate or dolomite. This may result in a wider and longer hydraulic and etched fracture, which can improve productivity of the wellbore. In some embodiments, a composition including a sulfobetaine may be added to the emulsified acid system to create a treatment composition. Thus, sulfobetaine composition may increase the viscosity of the treatment composition.

The sulfobetaine may act as a surfactant. Some examples of sulfobetaines that may be used in the treatment composition are described below. The sulfobetaine may be as described in international Application No. PCT/US2013/071130 to Ali et. al, incorporated by reference herein in its entirety.

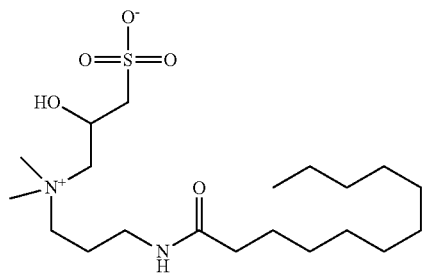

Alkyl amidopropyl hydroxyl sultaine

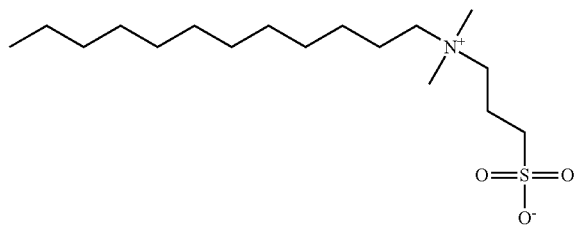

Alkyl sulfobetaine

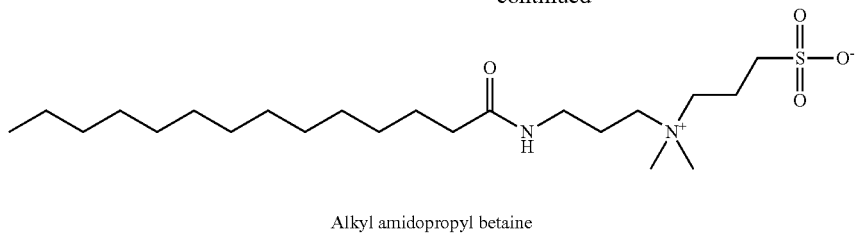

Alkyl amidopropyl betaine

In some embodiments, the sulfobetaine surfactant may be included as a part of a sulfobetaine mixture. The mixture may include the sulfobetaine surfactant as well as about 15% to about 30% (the percentage being the percentage of the mixture) of ethylene glycol monobutyl ether (EGMBE). The sulfobetaine surfactant may be a cationic surfactant including an ammonium chloride derivate and a linear alkylbenzenesulfonate. The surfactant may be a sodium alkylbenzenesulfonate, as represented below.

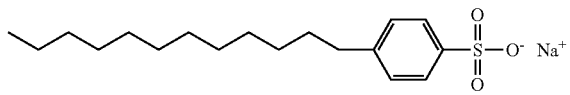 [SMILES: CCCCCCCCCCCCc1ccc(S(=O)(=O)[O-])cc1 ; [Na+]]

In embodiments, the sulfobetaine mixture comprises sodium alkylbenzenesulfonate, a quaternary ammonium chloride, 2-butoxyethanol and water. The sulfobetaine mixture may comprise (1) 5 to 40 wt %, or 10 to 30 wt %, or 10 to 20 wt % of sodium alkylbenzenesulfonate; (2) 5 to 40 wt %, or 10 to 30 wt %, or 10 to 20 wt % of quaternary ammonium chloride; (3) 15 to 30 wt % 2-butoxyethanol; and (4) 20 to 60 wt %, or 40 to 50 wt % water. The quaternary ammonium chloride may be an alkyl trimethyl ammonium chloride with the alkyl group being C12 to C18. In embodiments, the sulfobetaine mixture comprises 15-30% of EGMBE2-butoxyethanol, a cationic surfactant including an ammonium chloride derivate, and 10-20% of a linear sodium alkylbenzenesulfonate, 10-20% of a C12-C18 alkyltrimethyl ammonium chloride, and 46% water.

In embodiments where treatment of a subterranean formation occurs, the treatment may first include pumping a pre-flush solvent, such as xylene, toluene, heavy or aromatic compound, into the subterranean formation. The pre-flush solvent may remove paraffins and asphaltenes from the formation.

After the pre-flush solvent is pumped, a volume of acid, brine or other solution may be pumped into the exposed formation. In some embodiments, 50-100 gallons (190-380 liters) of emulsified acid per foot of exposed formation may be injected into the formation. This injection will allow for the acid to contact the surface of the geological formation and form wormholes, so as to increase the radius of the wellbore. In carbonate formations, the acid may contact the surface of the carbonate to form the wormholes, allowing for the wellbore radius to be increased.

In embodiments, the treatment composition including the emulsified acid with the sulfobetaine mixture may be used during an acid fracturing or hydraulic fracturing treatment. The treatment composition may be injected into a wellbore to enable live acid penetration along a fracture.

In embodiments, the treatment composition including the sulfobetaine mixture may perform effectively when mixed with chelating, inorganic or organic acids. In some embodiments, the viscosity reducing composition is present at about 0.2% to about 1% of the treatment composition.

It should be noted that although the current application is described in terms of matrix acidizing and acid fracturing of carbonate reservoirs, it may also apply to reservoirs which are comprised of varying percentages of both sandstone and carbonate in both producing and injection wells. The reservoirs may be fractured or non-fractured.

The foregoing is further illustrated by reference to the following examples, which are presented for purposes of illustration and are not intended to limit the scope of the present disclosure. The following examples test an emulsified acid system that may apply to both matrix acidizing and acid fracturing of carbonate reservoirs in both producing and injection wells. In the examples, the emulsified acid system is prepared by using the following procedure:

adding a volume of diesel into a Waring blender and mix at low speed, slowly adding the emulsifier;

preparing the volume of acid and adding it slowly into the Waring blender, increasing the speed of the mixer to a high mixing speed (of from about 9500 to about 12000 RPM); and mixing at the high speed for 20 minutes.

In the examples where the sulfobetaine mixture is added, the sulfobetaine mixture is added after the emulsion is formed, and is mixed with the emulsion (in the Waring blender) for 10 minutes.

An emulsified acid system including 0.6 vol. % AQUET 942, 0.1 vol. % corrosion inhibitor, 0.5 vol. % formic acid, 22 wt. % HCl and an amount of diesel sufficient to create a 70:30 acid:diesel emulsion was prepared. The shear rates of this system at both room temperature and 80° C. was tested. The results are shown in Tables 1A and 1B, below.

TABLE 1A

Room Temperature

| Shear Rate | 20 min | 30 min |
|---|---|---|
| 5.1 sec$^{-1}$ | 600 | 800 |
| 10.2 sec$^{-1}$ | 400 | 500 |
| 170 sec$^{-1}$ | 108 | 123 |
| 340 sec$^{-1}$ | 87 | 97.5 |
| 511 sec$^{-1}$ | 78 | 87 |

TABLE 1B 80 deg C.

| Shear Rate | 20 min | 30 min |
|---|---|---|
| 5.1 sec$^{-1}$ | 400 | 400 |
| 10.2 sec$^{-1}$ | 250 | 250 |
| 170 sec$^{-1}$ | 63 | 60 |

TABLE 1B-continued

| | 80 deg C. | |
|---|---|---|
| Shear Rate | 20 min | 30 min |
| 340 sec$^{-1}$ | 52.5 | 46.5 |
| 511 sec$^{-1}$ | 44 | 42 |

To determine and evaluate the properties of the emulsified acid system when a sulfobetaine mixture is added, two tests were performed. A rheology test was performed to determine the viscosity of the emulsion at different shear rates using a Fann-35 rheometer at room temperature and at 80° C. A slipperiness test was also performed by plugging the bottom of a glass funnel, filling the funnel completely (60 ml), and removing the plug of the funnel and recording the elapsed time until all the fluid has flowed out of the funnel.

EXAMPLE 1

The following example shows viscosities at particular shear rates for an emulsified acid system at room temperature and at 80° C. The following Table 2 shows the viscosities, at room temperature, at particular shear rates of the emulsified acid system (EAS), as well as the emulsified acid system with varying amounts of a sulfobetaine mixture (SM) included. The emulsified acid system was a system including 0.6 vol. % AQUET 942, 0.1 vol. % corrosion inhibitor, 0.5 vol. % formic acid, 22 wt. % HCl and an amount of diesel sufficient to create a 70:30 acid:diesel emulsion. The sulfobetaine mixture includes 15-30% of 2-butoxyethanol, 10-20% of a linear sodium alkylbenzenesulfonate, 10-20% of a C12-C18 alkyl trimethyl ammonium chloride and 46% water.

TABLE 2

| Viscosities (in centipoise) at Room Temperature aftr 20 minutes of shear | | | | | |
|---|---|---|---|---|---|
| | 5.1 sec$^{-1}$ | 10.2 sec$^{-1}$ | 170 sec$^{-1}$ | 340 sec$^{-1}$ | 511 sec$^{-1}$ |
| Emulsified acid system (EAS) | 600 cP | 400 cP | 108 cP | 87 cP | 48 cP |
| EAS + 0.2% sulfobetaine mixture (SM) | 600 cP | 450 cP | 120 cP | 93 cP | 80 cP |
| EAS + 0.4% SM | 600 cP | 450 cP | 130 cP | 97 cP | 82 cP |
| EAS + 0.5% SM | 800 cP | 550 cP | 141 cP | 112 cP | 105 cP |
| EAS + 0.6% SM | 300 cP | 200 cP | 81 cP | 67.5 cP | 61 cP |
| EAS + 1% SM | 300 cP | 200 cP | 81 cP | 64.5 cP | 57 cP |

The following Table 3 shows the viscosities, at 80° C., at particular shear rates of the emulsified acid system, as well as the emulsified acid system with varying amounts of a sulfobetaine mixture included. The emulsified acid system was a system including 0.6 vol. % AQUET 942, 0.1 vol. % corrosion inhibitor, 0.5 vol. % formic acid, 22 wt. % HCl and an amount of diesel sufficient to create a 70:30 acid:diesel emulsion. The sulfobetaine mixture includes 15-30% of 2-butoxyethanol, 10-20% of a linear sodium alkylbenzenesulfonate, 10-20% of a C12-C18 alkyl trimethyl ammonium chloride and 46% water.

TABLE 3

| Viscosities (in centipoise) at 80° C. after 20 minutes of shear | | | | | |
|---|---|---|---|---|---|
| | 5.1 sec$^{-1}$ | 10.2 sec$^{-1}$ | 170 sec$^{-1}$ | 340 sec$^{-1}$ | 511 sec$^{-1}$ |
| Emulsified acid system (EAS) | 400 cP | 250 cP | 63 cP | 52.5 cP | 44 cP |
| EAS + 0.2% sulfobetaine mixture (SM) | 400 cP | 250 cP | 81 cP | 64.5 cP | 54 cP |
| EAS + 0.4% SM | 400 cP | 300 cP | 90 cP | 69 cP | 60 cP |
| EAS + 0.5% SM | 600 cP | 40 cP | 102 cP | 76.5 cP | 64 cP |
| EAS + 0.6% SM | 300 cP | 63 | 81 cP | 50 cP | 41 cP |
| EAS + 1% SM | 300 cP | 200 cP | 60 cP | 48 cP | 41 cP |

FIG. 1 is a graphical depiction of the viscosities of the emulsified acid system (with and without the sulfobetaine mixture) at particular shear rates. The addition of some amounts of the sulfobetaine mixture to the emulsified acid system results in a more viscous fluid up to, as can be seen by Tables 2 and 3 and FIG. 1. Maximum viscosities are seen at both room temperature and 80° C. when 0.5% of the sulfobetaine mixture is included.

EXAMPLE 2

The following example shows the results of a slipperiness test at 80° C. Table 4 shows the time taken for fluid to flow out of the funnel using an emulsified acid system (EAS) as well as an emulsified acid system with varying amounts of sulfobetaine mixture (SM). The emulsified acid system was a system including 0.6 vol. % AQUET 942, 0.1 vol. % corrosion inhibitor, 0.5 vol. % formic acid, 22 wt. % HCl and an amount of diesel sufficient to create a 70:30 acid:diesel emulsion. The sulfobetaine mixture includes 15-30% of 2-butoxyethanol, 10-20% of a linear sodium alkylbenzenesulfonate, 10-20% of a C12-C18 alkyl trimethyl ammonium chloride and 46% water.

TABLE 4

| Slipperiness Test Results | |
|---|---|
| System | Time (seconds) |
| EAS | 27 |
| EAS + 0.2% SM | 38 |
| EAS + 0.4% SM | 40 |
| EAS + 0.5% SM | 60 |
| EAS + 0.6% SM | 39 |
| EAS + 1% SM | 37 |

Figure 2:
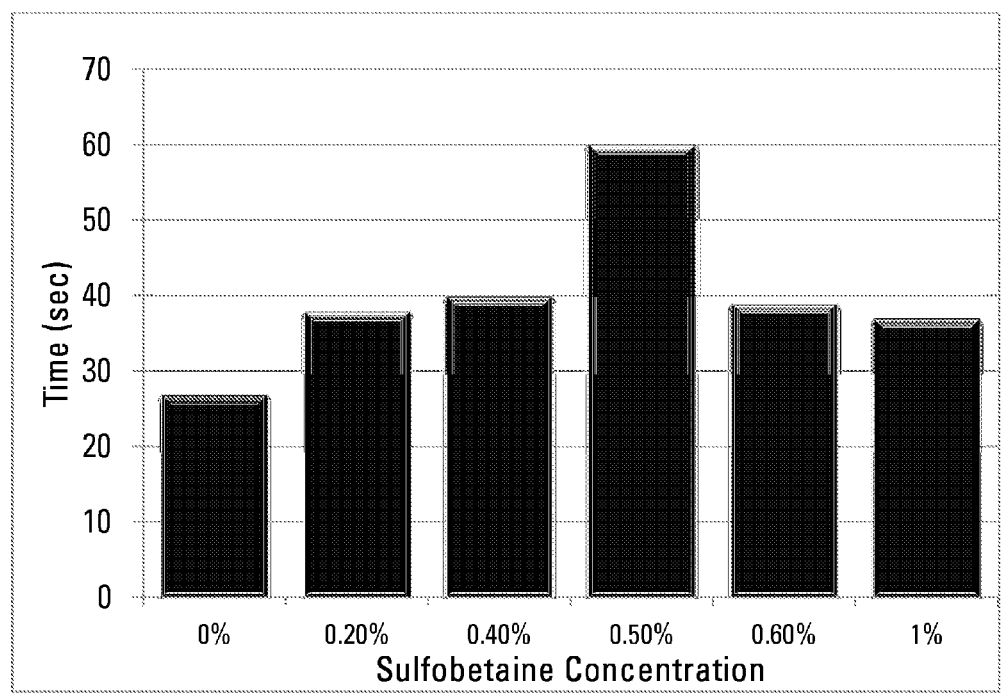
FIG. 2 shows a graphical example of the performance of compositions according to one or more embodiments herein.

As can be seen in FIG. 2, which is a graphical depiction of Table 4, the longest time to pass through the funnel occurred when 0.5% of the sulfobetaine mixture was added to the emulsified acid system.

EXAMPLE 3

The following example shows viscosities at particular shear rates for an emulsified acid system (EAS) at room temperature and at 80° C. The following Tables 5 and 6 show the viscosities, at room temperature and at 80° C., respectively, at particular shear rates of the emulsified acid system, as well as the emulsified acid system with an amount of a sulfobetaine mixture (SM) included. The emulsified acid system was a system including 0.3 vol. % AQUET 942, 0.1 vol. % corrosion inhibitor, 0.5 vol. % formic acid, 22 wt. % HCl and an amount of diesel sufficient to create a 70:30 acid:diesel emulsion. The sulfobetaine mixture includes 15-30% of 2-butoxyethanol, 10-20% of a linear sodium alkylbenzenesulfonate, 10-20% of a C12-C18 alkyl trimethyl ammonium chloride and 46% water.

TABLE 5

Viscosities (in centipoise) at Room Temperature after 20 minutes of shear

|  | 5.1 sec$^{-1}$ | 10.2 sec$^{-1}$ | 170 sec$^{-1}$ | 340 sec$^{-1}$ | 511 sec$^{-1}$ |
|---|---|---|---|---|---|
| EAS | 500 | 350 | 90 | 75 | 70 |
| EAS + 0.2% SM | 600 | 400 | 108 | 87 | 78 |

TABLE 6

Viscosities (in centipoise) at 80° C. after 20 minutes of shear

|  | 5.1 sec$^{-1}$ | 10.2 sec$^{-1}$ | 170 sec$^{-1}$ | 340 sec$^{-1}$ | 511 sec$^{-1}$ |
|---|---|---|---|---|---|
| EAS | 200 | 150 | 51 | 39 | 35 |
| EAS + 0.2% SM | 300 | 200 | 200 | 49.5 | 46 |

Again, at both room temperature and 80° C., the composition including the sulfobetaine mixture shows a higher viscosity at all shear rates.

EXAMPLE 4

The following example shows the results of a slipperiness test at 80° C. Table 7 shows the time taken for fluid to flow out of the funnel using an emulsified acid system (EAS) as well as an emulsified acid system with an amount of sulfobetaine mixture (SM). The emulsified acid system was a system including 0.3 vol. % AQUET 942, 0.1 vol. % corrosion inhibitor, 0.5 vol. % formic acid, 22 wt. % HCl and an amount of diesel sufficient to create a 70:30 acid:diesel emulsion. The sulfobetaine mixture includes 15-30% of 2-butoxyethanol, 10-20% of a linear sodium alkylbenzenesulfonate, 10-20% of a C12-C18 alkyl trimethyl ammonium chloride and 46% water.

TABLE 7

Slipperiness Test Results

| System | Time (sec) |
|---|---|
| EAS | 27 |
| EAS + 0.2% SM | 38 |

EXAMPLE 5

The following example shows viscosities at particular shear rates for an emulsified acid system (EAS) at room temperature and at 80° C. The following Tables 8 and 9 show the viscosities, at room temperature and at 80° C., respectively, at particular shear rates of the emulsified acid system, as well as the emulsified acid system with an amount of a sulfobetaine mixture (SM) included. The emulsified acid system was a system including 0.3 vol. % AQUET 942, 0.1 vol. % corrosion inhibitor, 0.5 vol. % formic acid, 22 wt. % HCl and an amount of diesel sufficient to create a 80:20 acid:diesel emulsion. The sulfobetaine mixture includes 15-30% of 2-butoxyethanol, 10-20% of a linear sodium alkylbenzenesulfonate, 10-20% of a C12-C18 alkyl trimethyl ammonium chloride and 46% water.

TABLE 8

Viscosities (in centipoise) at Room Temperature after 20 minutes of shear

|  | 5.1 sec$^{-1}$ | 10.2 sec$^{-1}$ | 170 sec$^{-1}$ | 340 sec$^{-1}$ | 511 sec$^{-1}$ |
|---|---|---|---|---|---|
| EAS | 500 | 350 | 108 | 81 | 68 |
| EAS + 0.2% SM | 600 | 600 | 132 | 93 | 74 |
| EAS + 0.4% SM | 500 | 400 | 123 | 91.5 | 76 |

TABLE 9

Viscosities (in centipoise) at 80° C. after 20 minutes of shear

|  | 5.1 sec$^{-1}$ | 10.2 sec$^{-1}$ | 170 sec$^{-1}$ | 340 sec$^{-1}$ | 511 sec$^{-1}$ |
|---|---|---|---|---|---|
| EAS | 900 | 600 | 183 | 144 | 126 |
| EAS + 0.2% SM | 1300 | 950 | 267 | 193.5 | 161 |
| EAS + 0.4% SM | 900 | 600 | 264 | 192 | 168 |

Again, at both room temperature and 80° C., the composition including the 0.2% sulfobetaine mixture shows a higher viscosity at all shear rates. At 0.4% sulfobetaine mixture, the composition shows an equal or higher viscosity as compared to just the emulsified acid system at all shear rates.

EXAMPLE 6

Figure 3:
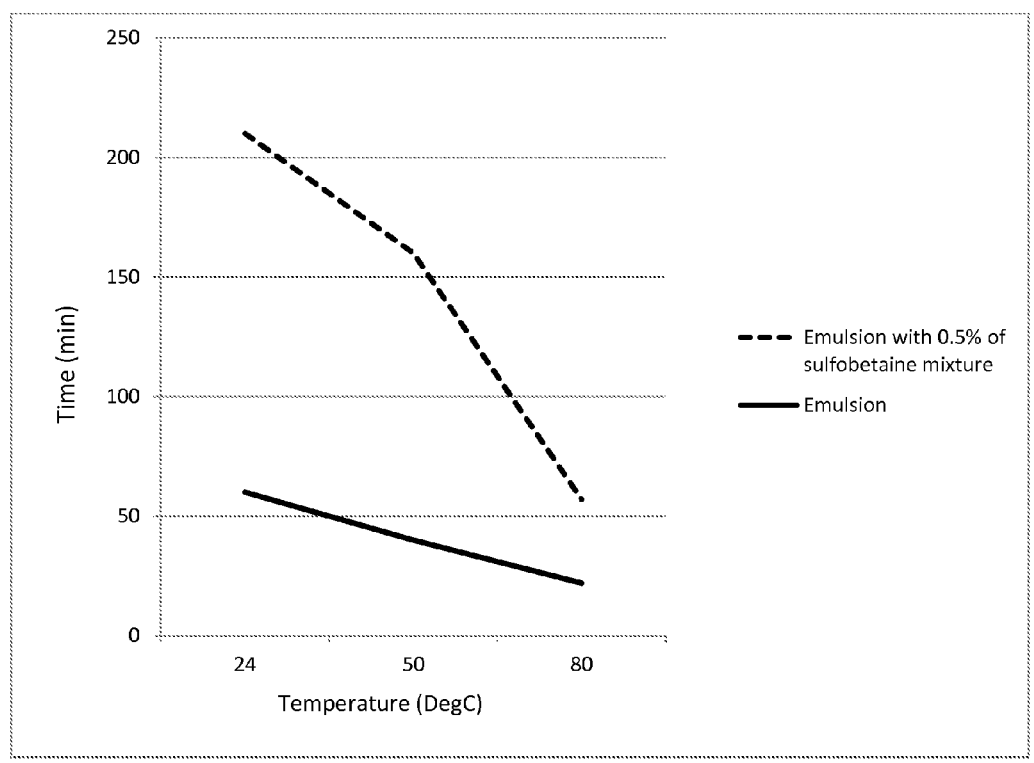
FIG. 3 shows a graphical example of the reaction rate of compositions according to one or more embodiments.

FIG. 3 shows a figure of a 70:30 (acid:diesel) emulsion and its reaction rate at various temperatures. The emulsified acid system was a system including 0.6 vol. % AQUET 942, 0.1 vol. % corrosion inhibitor, 0.5 vol. % formic acid, 22 wt. % HCl and an amount of diesel sufficient to create a 80:20 acid:diesel emulsion. The sulfobetaine mixture includes 15-30% of 2-butoxyethanol, 10-20% of a linear sodium alkylbenzenesulfonate, 10-20% of a C12-C18 alkyl trimethyl ammonium chloride and 46% water. When 0.5% of the sulfobetaine mixture was included, the reaction rates were higher across all temperatures as compared to just the emulsified acid composition.

EXAMPLE 7

Core flow tests were run to determine wormholing efficiency on an emulsified acid with a sulfobetaine mixture as compared to a conventional, 70:30 (acid:diesel) emulsified acid system. The emulsified acid system was a system including 0.6 vol. % AQUET 942, 0.1 vol. % corrosion inhibitor, 0.5 vol. % formic acid, 22 wt. % HCl and an amount of diesel sufficient to create a 80:20 acid:diesel emulsion. The sulfobetaine mixture includes 15-30% of 2-butoxyethanol, 10-20% of a linear sodium alkylbenzenesulfonate, 10-20% of a C12-C18 alkyl trimethyl ammonium chloride and 46% water.

At a pore pressure of 500 pounds per square inch (psi), a confining pressure of 1000 psi, and a temperature of 80° C., a core sample of Indiana Limestone with a pore volume of 8.3 cubic centimeters, a length of 2 inches and a diameter of 1.5 inches were tested. The pore volumes to break through with the emulsified acid system plus 0.5% of the sulfobetaine mixture were found to be less than for the emulsified acid system without the sulfobetaine mixture. In the case of the emulsified acid with the 0.5% sulfobetaine mixture, a single, well-defined wormhole was created along the entire length of the core. With just the emulsified acid system (without the sulfobetaine mixture included), more than one wormhole was created.

The Examples show that the resultant fluid is more viscous and more retarded when the sulfobetaine mixture is included as compared to a conventional emulsified acid system. In matrix applications, such a retarded, viscous fluid, especially when pumped below the fracture gradient, may improve the wormholing efficiency of the acid. This may be particularly beneficial in formations comprised of carbonate or dolomite. This may result in a wider and longer hydraulic and etched fracture, which can improve productivity of the wellbore.

Although the preceding description has been described herein with reference to particular means, materials and embodiments, it is not intended to be limited to the particulars disclosed herein; rather, it extends to all functionally equivalent structures, methods and uses, such are within the scope of the appended claims.

What is claimed is:

1. A composition for treatment of a subterranean formation, the composition comprising an emulsified acid system and a sulfobetaine surfactant comprising a cationic surfactant comprising an ammonium chloride derivative and a linear alkylbenzenesulfonate.

2. The composition according to claim 1, wherein an emulsifier present in the emulsified acid system is present at about 0.1 to about 1.0 vol. % of the emulsified acid.

3. The composition according to claim 1, wherein the emulsified acid includes an inhibitor aid.

4. The composition according to claim 3, wherein the inhibitor aid is a formic acid.

5. The composition according to claim 3, wherein the inhibitor aid is present from about 0.1 to about 1.0 vol. % of the emulsified acid.

6. The composition according to claim 1, wherein the emulsified acid includes hydrochloric acid.

7. The composition according to claim 6, wherein the hydrochloric acid is present from about 5 wt. % to about 32 wt. % of the emulsified acid.

8. The composition according to claim 7, wherein the hydrochloric acid is present from about 10 wt. % to about 28 wt. % of the emulsified acid.

9. The composition according to claim 1, further comprising diesel.

10. The composition according to claim 9, further comprising an amount of diesel sufficient to make between a 90:10 (acid:diesel) and a 60:40 (acid:diesel) emulsion.

11. The composition according to claim 9, further comprising an amount of diesel sufficient to make a 70:30 (acid:diesel) emulsion.

12. The composition according to claim 9, further comprising an amount of diesel sufficient to make an 80:20 (acid:diesel) emulsion.

13. The composition according to claim 1, further comprising ethyleneglycolmonobutylether-2-butoxyethanol.

14. A method for treating a subterranean formation, comprising:
adding a sulfobetaine surfactant to an emulsified acid, thereby forming a treatment composition, and
injecting the treatment composition to the subterranean formation; wherein the sulfobetaine surfactant comprises a cationic surfactant comprising an ammonium chloride derivative and a linear alkylbenzenesulfonate.

15. The method according to claim 14, wherein the emulsified acid includes hydrochloric acid.

16. The method according to claim 14, wherein the emulsified acid includes an emulsifier.

17. A method for performing an acidizing treatment in a subterranean formation, comprising:
adding a sulfobetaine surfactant to an emulsified acid, thereby forming a treatment composition, and
injecting the treatment composition to the subterranean formation to thereby induce a fracture at a portion of the subterranean formation; wherein the sulfobetaine surfactant comprises a cationic surfactant comprising an ammonium chloride derivative and a linear alkylbenzenesulfonate.

18. The method according to claim 17, wherein the emulsified acid includes hydrochloric acid.

* * * * *